Patented July 23, 1940

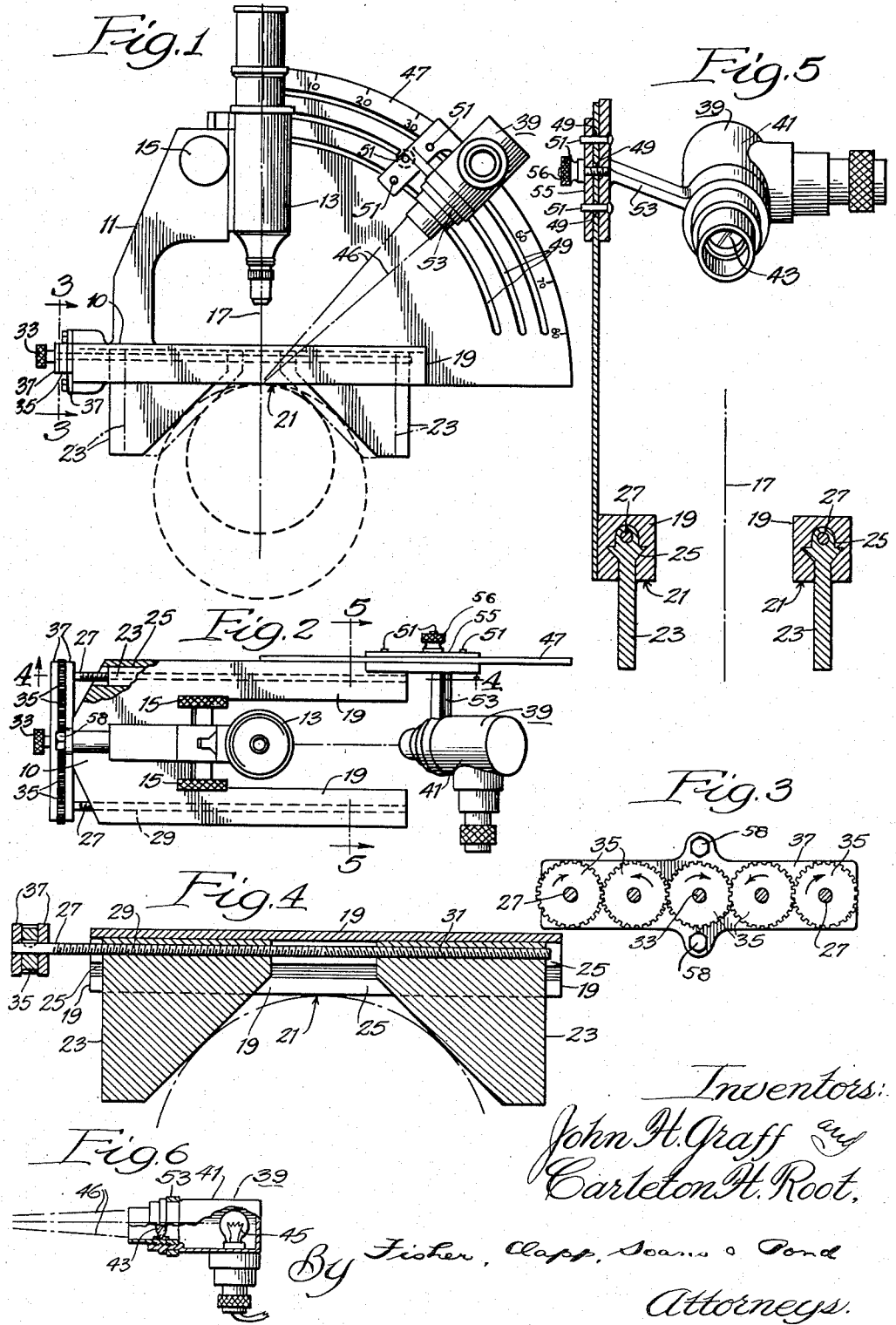

2,208,882

UNITED STATES PATENT OFFICE 2,208,882

MICROSCOPE

John H. Graff and Carleton H. Root, Appleton, Wis., assignors to The Institute of Paper Chemistry, Appleton, Wis., a corporation of Wisconsin Application March 22, 1939, Serial No. 263,451

4 Claims. (Cl. 88—39)

Our invention relates to microscopes and particularly to microscopes for use in the examination and comparison of materials having a surface texture or finish which may or may not have a directional characteristic, as, for example, textiles, engraved or etched printing surfaces, painted surfaces, polished surfaces, plastics, ceramics, and the like.

The objects of the present invention include the provision of an improved microscope support so constructed that the top plane of the object under examination shall be coincident with the plane of support of the microscope; the provision of an improved variable angle illuminating apparatus for use in connection with a microscope of this general type; the provision of an improved microscope positioning means which shall facilitate the locating of the microscope with relation to the object to be examined; and, generally, the provision of an improved combined microscope and variable angle illuminating apparatus particularly adapted for the examination of materials of the above described types.

These and other objects and the numerous advantages of the invention will be made more apparent in the accompanying drawing and the following description of one preferred embodiment thereof. In the drawing—

Figure 1 is a side elevational view of a combined microscope and variable angle illuminator embodying the principles of our invention;

Figure 2 is a top plan view of the combined microscope and illuminator illustrated in Figure 1;

Figure 3 is an enlarged sectional view on the general line 3—3 of Figure 1 and illustrates one form of operating mechanism for the wedge or clamp positioning means forming a part of the instrument illustrated in that figure;

Figures 4 and 5 are enlarged sectional views taken, respectively, on the general lines 4—4 and 5—5 of Figure 2; and Figure 6 is a fragmentary view, partially in section, illustrating certain of the features of the variable angle illuminator forming a part of the instrument of our invention.

The combined microscope and illuminator illustrated in the drawing includes a rigid, cast metal frame 10 provided with a centrally located, upright portion 11 upon which the microscope proper 13 is supported so as to be axially adjustable in response to the rotation of a suitable adjusting means such as the knobs 15. The microscope proper 13 is not an important part of this invention, and any of the well known forms may be used. The optical axis of the microscope proper 13 is indicated in the drawing by the dot and dash lines 17.

The frame 10 is also provided with a bifurcated base portion 19, the two sections of which are cast integrally with the upright 11. The under surface of the bifurcated base portion 19, indicated at 21, is machined flat and serves both as the plane of support for the instrument and as the plane of observation for the surface under examination. Preferably, the surface 21 is perpendicular to the optical axis 21 of the microscope proper 13.

In order to facilitate the positioning of the microscope on objects such as square blocks, cylinders, etc., each of the bifurcated base portions 19 is provided with a pair of adjustable wedge or clamp members 23 which slidably engage suitable dovetail grooves 25 machined in the base portions 19, as illustrated particularly in Figures 4 and 5. To accomplish simultaneous operation of each pair of these clamp members, the apparatus includes two drive screws 27, each of which is provided with two oppositely threaded portions 29 and 31 (Figure 4) arranged to engage suitable cooperating threaded portions formed in the upper end of the clamp or wedge members 25. The drive screws 27 are arranged to be actuated simultaneously by a single operating knob 33 which is operatively connected thereto by any suitable means such as the gearing 35 illustrated in Figures 2 and 4. The actuating means for the drive screws 27 is rigidly supported upon the frame 10 by suitable means such as the bar members 37 and includes means for restraining the drive screws 27 against axial movement.

To provide for the illumination of the surface under examination by the microscope, the instrument includes a variable angle illuminator 39 similar in certain respects to the apparatus disclosed in United States Patent No. 2,144,653. This device, as illustrated in Figures 1, 2, and 6, includes a suitably proportioned light tube 41, preferably formed of sheet metal, within which are positioned a lens 43 and a light bulb 45, the filament of which is coincident with the axis of the light tube. The lens is in such position with relation to the filament of the light bulb that a concentrated beam of light will be emitted from the device as indicated by the dash lines 46 in Figures 1 and 6.

In order to accomplish variable angle illumination of the surfaces of objects located in the plane of observation 21 of the microscope, it is important that the beam of light produced by the illuminator 39 shall be rotatable about an axis extending transversely to the axis of the beam and intersecting the plane of observation 21 of the microscope, preferably at the point of intersection with that plane of the optical axis 17 of the microscope proper 13. This is accomplished in the apparatus illustrated in the drawing through the use of a support plate 47 rigidly attached to the microscope frame 10 and provided with three arcuate grooves 49 which are engaged by suitable pins 51 affixed to one end of a bracket 53 which in turn supports the illuminator 39. The pins 53 are of sufficient length to engage a clamping plate 55 positioned at the outer side of the plate 47, and at least one of the pins 51 is threaded for receiving a clamping nut 56 whereby the illuminator may be secured in any desired position.

In the particular apparatus disclosed, the angle of incidence of the beam produced by the illuminator can be varied from a minimum of about 13° to a maximum of 90°. This range is usually sufficient for all ordinary types of work.

During use of the apparatus, it is necessary merely to place the microscope over the object or surface to be examined, adjust the wedge or clamping members 23 to prevent movement of the instrument during the observation, and then proceed with the observations. The clamp members 23 readily adjust themselves to objects of various sizes or shapes, as illustrated by the dotted lines in Figure 1, and for use with square sided or flat surfaced objects the clamp members can be readily reversed in position or entirely removed. The entire clamping mechanism is removable as a unit by merely unscrewing the cap screws 58.

Due to the fact that the lower surface 21 of the base portion 19 of the microscope constitutes both the plane of support and the plane of observation of the instrument, and due to the fact that the axis of the beam of light produced by the variable angle illuminator at all times automatically intersects the plane of this surface at a point coincident with the point at which the optical axis 17 of the microscope proper 13 intersects the plane of this surface, observations at various angles of illumination can be made with a minimum of time and a minimum of effort. In effect, the apparatus is at all times in proper adjustment and it is practically impossible to use the instrument incorrectly.

It will thus be seen that we have disclosed a simple, foolproof microscope particularly adapted for the examination of the surfaces of objects and materials under light at various angles of illumination. The apparatus has particular immediate application in the textile, paper, and printing industries, but is in no sense restricted to those uses. It is our desire, therefore, that the accompanying claims shall be accorded the broadest reasonable construction consistent with the language appearing therein and the prior art.

We claim the following as our invention:

1. An instrument of the class described comprising a main frame having an upright, microscope supporting portion and a bifurcated base portion, a microscope axially adjustably supported on said upright portion, the under surface of said bifurcated base portion being flat and constituting both the plane of support and the plane of observation of said instrument, a pair of adjustable, cooperating clamp members supported upon and extending downwardly from the under side of each section of said bifurcated base portion for positioning the object being examined relative to said microscope during the use thereof, and means for simultaneously moving each pair of cooperating clamp members toward or away from each other.

2. An instrument of the class described comprising a main frame having an upright microscope supporting portion and a base portion, the under surface of said base portion being flat and constituting both the plane of observation and the plane of support of said instrument, a microscope axially adjustably supported on said upright portion with the optical axis thereof generally perpendicular to the plane of the under surface of said base portion, a variable angle illuminator which is operable to produce a concentrated beam of light for illuminating the surface of objects located in said observation and support plane, means supporting said illuminator upon said frame for rotation about an axis which intersects, and which extends generally transversely to the axis of said light beam, adjustable clamping means supported upon said base portion and extending downwardly therefrom for positioning the object being examined relative to said microscope during the use thereof, said illuminator support means being so positioned relative to the other elements of said instrument that the axis of said light beam will at all times intersect the axis of rotation of said light tube and beam at a single point along the optical axis of said microscope.

3. An instrument of the class described comprising a main frame having an upright microscope supporting portion and a base portion, the under surface of said base portion being flat and constituting both the plane of observation and the plane of support of said instrument, a microscope axially adjustably supported on said upright portion with the optical axis thereof perpendicular to the plane of the under surface of said base portion, a variable angle illuminator which is operable to produce a concentrated beam of light for illuminating the surface of objects located in said observation and support plane, said illuminator including a light tube, a source of illumination and a lens, both disposed within said light tube and cooperating therewith to produce said concentrated beam of light, means supporting said light tube upon said base portion for rotation about an axis which intersects, and which extends generally transversely to, the axis of said light beam, said support means being so positioned relative to said light tube and the plane of said base portion that the axis of said light beam will at all times intersect the axis of rotation of said light tube and beam at the point of intersection of the optical axis of said microscope with said observation and support plane, and adjustable clamping means supported upon said base portion and extending downwardly therefrom for positioning the object being examined relative to said microscope during the use thereof.

4. An instrument of the class described comprising a main frame having an upright microscope supporting portion and a bifurcated base portion, the under surface of said base portion being flat and constituting both the plane of observation and the plane of support of said instrument, a microscope axially adjustably supported on said upright portion with the optical axis thereof perpendicular to the plane of the under surface of said base portion, a variable angle illuminator which is operable to produce a concentrated beam of light for illuminating the surface of objects located in said observation and support plane, said illuminator including a light tube, a source of illumination and a lens, both disposed within said light tube and cooperating therewith to produce said concentrated beam of light, means supporting said light tube upon said main frame including a secondary frame having the general form of a circular sector, said secondary frame being provided with a plurality of arcuate guide slots which are engaged by means fixedly attached to said light tube whereby said tube may be rotated about an axis which intersects, and which extends generally transversely to, the axis of said light beam, said secondary frame and said guide slots being so positioned relative to said light tube and the under surface of said base portion that the axis of said light beam will at all times intersect the axis of rotation of said light tube and beam at the point of intersection of the optical axis of said microscope with said observation and support plane, a pair of adjustable, cooperating clamp members supported upon each section of said bifurcated base portion for positioning the object being examined relative to said microscope during the use thereof, and means for simultaneously moving each pair of cooperating clamp members toward or away from each other.

JOHN H. GRAFF.
CARLETON H. ROOT.